(12) United States Patent
Barbu (10) Patent No.: US 12,497,007 B2
(45) Date of Patent: Dec. 16, 2025

(54) SYSTEMS AND METHODS FOR BRAKING ASSISTANCE FOR VEHICLES

(71) Applicant: GM GLOBAL TECHNOLOGY OPERATIONS LLC, Detroit, MI (US)

(72) Inventor: Decebal Catalin Barbu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 243 days.

(21) Appl. No.: 18/356,648

(22) Filed: Jul. 21, 2023

(65) Prior Publication Data

US 2025/0026326 A1 Jan. 23, 2025

(51) Int. Cl.
*B60T 8/1761* (2006.01)

(52) U.S. Cl.
CPC ....... *B60T 8/17616* (2013.01); *B60T 2260/06* (2013.01); *B60T 2270/10* (2013.01)

(58) Field of Classification Search
CPC ............. B60T 8/17616; B60T 2260/06; B60T 2270/10
See application file for complete search history.

(56) References Cited

U.S. PATENT DOCUMENTS

| 2015/0224845 A1* | 8/2015 | Anderson | B60G 17/052 |
| | | | 701/37 |
| 2018/0126981 A1* | 5/2018 | Gangwar | B60W 30/08 |
| 2023/0271594 A1* | 8/2023 | Chen | B60W 10/18 |
| | | | 701/70 |

* cited by examiner

*Primary Examiner* — Andrew J Cromer
(74) *Attorney, Agent, or Firm* — Ingrassia Fisher & Lorenz, LLP | IF&L (57) ABSTRACT

Systems and methods are provided for braking assistance for a vehicle. The systems include a sensor system, a controller configured to, by one or more processors: receive, from the sensor system, sensor data, detect a braking event of the vehicle, monitor a vehicle state of the vehicle including a deceleration rate of the vehicle, wherein the vehicle state and the deceleration rate is based on the sensor data, process the sensor data to determine whether the vehicle state will trigger activation of an antilock braking system (ABS), and output one or more control signals to command a braking system to reduce a braking torque applied to wheels at a rate sufficient to reduce compression of the front suspension system prior to a complete stop thereof in response to the deceleration rate satisfying a stopping criteria and a determination that the vehicle state will not trigger activation of the ABS.

17 Claims, 3 Drawing Sheets

SYSTEMS AND METHODS FOR BRAKING ASSISTANCE FOR VEHICLES

INTRODUCTION

The technical field generally relates to vehicle braking events, and more particularly relates to systems and methods capable of providing braking assistance to reduce suspension rebound motions that may occur upon a complete stop of the vehicle.

When a vehicle comes to a complete stop, a rebound or bounce motion occurs afterward that is primarily due to the suspension system. The suspension system of a vehicle is designed to provide a smooth and comfortable ride by absorbing and dampening the shocks and vibrations from the roadway. When the vehicle is coming to a stop, the suspension system compresses and stores energy in the form of compressed springs or other suspension components. This energy is then released or reduced when the vehicle completely stops. The rebound happens as the springs or suspension components extend back to their original position, causing the vehicle to bounce slightly.

This rebound motion may have various negative consequences in addition to affecting passenger ride quality. For example, the rebound may cause wear on and thereby reduce the longevity of certain components of the vehicle, especially those associated with the suspension system such as springs and dampers (shock absorbers).

Accordingly, it is desirable to provide systems or methods capable of reducing and/or mitigating this rebound motion. Furthermore, other desirable features and characteristics of the present invention will become apparent from the subsequent detailed description and the appended claims, taken in conjunction with the accompanying drawings and the foregoing technical field and background.

SUMMARY

A method is provided for braking assistance for a vehicle. In one example, the method includes receiving, from one or more sensors of the vehicle, sensor data indicative of an observable condition of the vehicle, detecting, with one or more processors, a braking event of the vehicle, monitoring, with the one or more processors, a vehicle state of the vehicle including a deceleration rate of the vehicle during a braking cycle in response to detecting the braking event, wherein the vehicle state and the deceleration rate is based on the observable condition, processing, with the one or more processors, the sensor data to determine whether the vehicle state will trigger activation of an antilock braking system (ABS) of the vehicle, and outputting, with the one or more processors, one or more control signals to command a braking system of the vehicle to reduce a braking torque applied to wheels of the vehicle by the braking system at a rate sufficient to reduce compression of a front suspension system of the vehicle prior to a complete stop of the vehicle in response to the deceleration rate satisfying a stopping criteria and a determination that the vehicle state will not trigger activation of the ABS.

In various examples, the one or more control signals command the braking system to reduce the braking torque at a rate sufficient to reduce a rebound motion of the vehicle that occurs at the complete stop of the vehicle.

In various examples, the method includes, by the one or more processors: estimating a complete stop event when the vehicle is expected to stop based, at least in part, on the deceleration rate, and generating the one or more control signals to command the braking system to reduce the braking torque over a time period of two seconds or less prior to the complete stop event.

In various examples, detecting the braking event is based on the observable condition.

In various examples, the sensor data includes data indicative of wheel slip of the wheels of the vehicle, and a determination is made that the vehicle state will trigger activation of the ABS in response to detection of the wheel slip.

In various examples, a determination is made that the vehicle state will trigger activation of the ABS in response to the deceleration rate exceeding a deceleration threshold.

In various examples, the stopping criteria includes data correlating the deceleration rate and time.

In various examples, the sensor data include wheel data indicative of wheel slip of the wheels of the vehicle generated by a wheel speed sensor of the vehicle, and acceleration data indicative of the deceleration rate of the vehicle generated by a deceleration sensor of the vehicle.

A system is provided for braking assistance for a vehicle. In one example, the system includes a sensor system including one or more sensors configured to sense an observable condition of the vehicle, a controller in operable communication with the sensor system and a braking system of the vehicle. The controller is configured to, by one or more processors: receive, from the sensor system, sensor data indicative of the observable condition of the vehicle, detect a braking event of the vehicle, monitor a vehicle state of the vehicle including a deceleration rate of the vehicle during a braking cycle in response to detecting the braking event, wherein the vehicle state and the deceleration rate is based on the observable condition, process the sensor data to determine whether the vehicle state will trigger activation of an antilock braking system (ABS) of the vehicle, and output one or more control signals to command a braking system of the vehicle to reduce a braking torque applied to wheels of the vehicle by the braking system at a rate sufficient to reduce compression of a front suspension system of the vehicle prior to a complete stop of the vehicle in response to the deceleration rate satisfying a stopping criteria and a determination that the vehicle state will not trigger activation of the ABS.

In various examples, the one or more control signals command the braking system to reduce the braking torque at a rate sufficient to reduce a rebound motion of the vehicle that occurs at the complete stop of the vehicle.

In various examples, the controller is configured to, with the one or more processors: estimate a complete stop event when the vehicle is expected to stop based, at least in part, on the deceleration rate, and generate the one or more control signals to command the braking system to reduce the braking torque over a time period of two seconds or less prior to the complete stop event.

In various examples, the controller is configured to, with the one or more processors, detect the braking event of the vehicle based on the observable condition.

In various examples, the sensor data includes data indicative of wheel slip of wheels of the vehicle, and the controller is configured to, with the one or more processors, determine that the vehicle state will trigger activation of the ABS in response to detection of the wheel slip.

In various examples, the controller is configured to, with the one or more processors, determine that the vehicle state will trigger activation of the ABS in response to the deceleration rate exceeding a deceleration threshold.

In various examples, the stopping criteria includes data correlating the deceleration rate and time.

In various examples, the sensor data include wheel data indicative of wheel slip of wheels of the vehicle generated by a wheel speed sensor, and the deceleration rate of the vehicle generated by a deceleration sensor.

A vehicle is provided that, in one example, includes a braking system configured to apply a braking torque to wheels of the vehicle, a sensor system including one or more sensors configured to sense an observable condition of the vehicle, an anti-lock braking system (ABS), a front suspension system, and a controller in operable communication with the braking system and the sensor system. The controller is configured to, by one or more processors: receive, from the sensor system, sensor data indicative of the observable condition of the vehicle, detect a braking event of the vehicle, monitor a vehicle state of the vehicle including a deceleration rate of the vehicle during a braking cycle in response to detecting the braking event, wherein the deceleration rate is based on the observable condition, process the sensor data to determine whether the vehicle state will trigger activation of the ABS of the vehicle, and output one or more control signals to command the braking system of the vehicle to reduce the braking torque applied to the wheels of the vehicle by the braking system at a rate sufficient to reduce compression of the front suspension system of the vehicle prior to a complete stop of the vehicle in response to the deceleration rate satisfying a stopping criteria and a determination that the vehicle state will not trigger activation of the ABS.

In various examples, the one or more control signals command the braking system to reduce the braking torque at a rate sufficient to reduce a rebound motion of the vehicle that occurs at the complete stop of the vehicle.

In various examples, the controller is configured to, with the one or more processors: estimate a complete stop event wherein the vehicle is expected to stop based, at least in part, on the deceleration rate, and generate the one or more control signals to command the braking system to reduce the braking torque over a time period of two seconds or less prior to the complete stop event.

In various examples, the one or more sensors of the sensor system include a wheel speed sensor configured to sense a speed of rotation of the wheels of the vehicle, and generate wheel data indicative of wheel slip of the wheels, and a deceleration sensor configured to sense the deceleration rate of the vehicle, and generate deceleration data indicative of the deceleration rate. The sensor data includes the wheel data and the deceleration data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an example of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
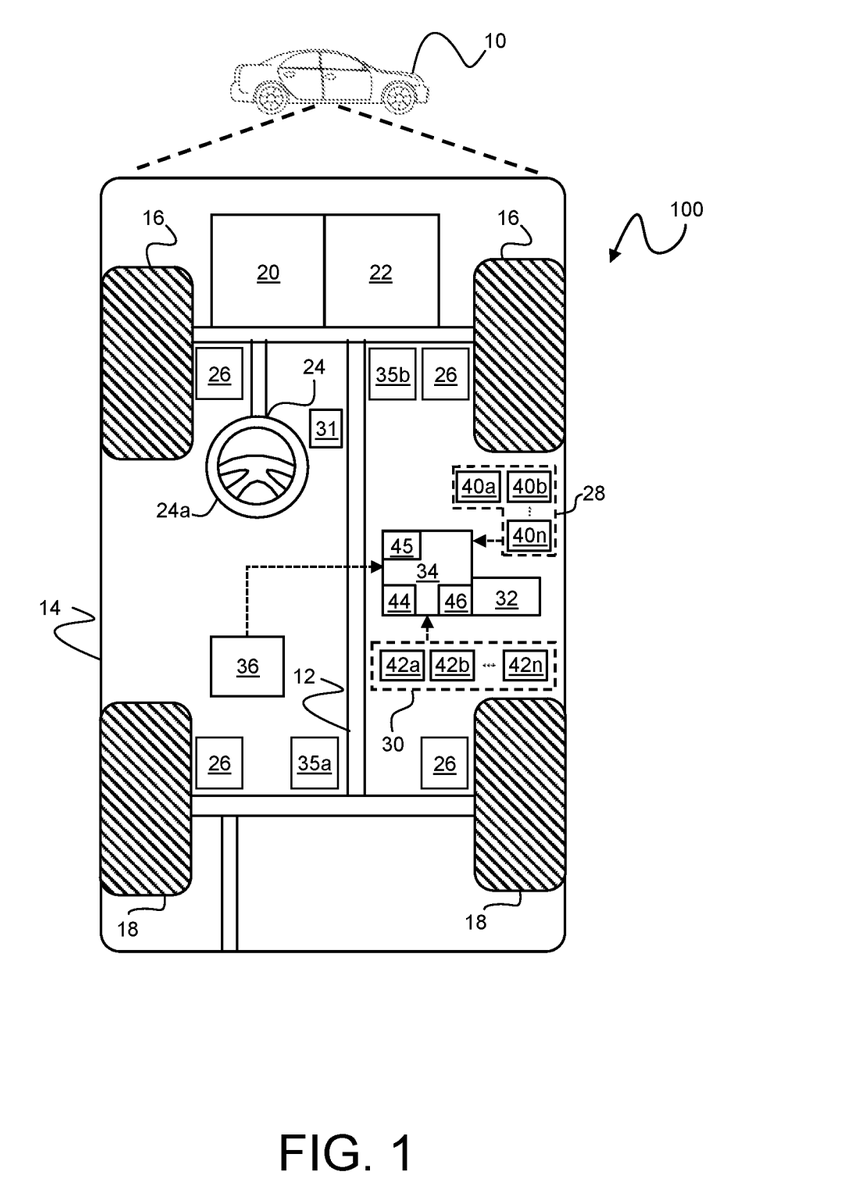
FIG. 1 is a functional block diagram illustrating a vehicle braking assistance system for a vehicle in accordance with various implementations.

FIG. 1 illustrates a vehicle 10 that includes a braking assistance system 100, according to one example. The system 100 is configured to monitor braking events and, under certain conditions, automatically reduce braking torque (braking pressure or braking force) applied by a braking system 26 to wheels 16-18 of the vehicle 10 in a gradual, progressive, incremental, linear, exponential, or other manner intended to reduce a rebound motion of the vehicle 10 upon complete stop thereof. In particular, manually controlled or operator initiated braking during a braking cycle often results in a rebound motion upon complete stop of the vehicle due to a reduction of compression within a front suspension system 35b of the vehicle caused by forward momentum thereof. The system 100 reduces or eliminates this rebound motion by reducing the compression within the front suspension system 35b thereof and thereby promotes passenger comfort and longevity of certain components of the vehicle 10, such as those associated with the front suspension system 35b. As used herein, a braking event refers to initiation of the braking torque to the wheels 16-18 by the braking system 26 (e.g., application of a brake pedal 31), a complete stop event refers to a complete stop of the vehicle 10 (i.e., zero velocity), and a braking cycle refers to a continuous or non-continuous application of the braking torque by the braking system 26 between the braking event and the complete stop event.

In certain examples, the vehicle 10 comprises an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain examples. In certain examples, the vehicle 10 may also comprise a motorcycle, recreational vehicle, military vehicle, train, and/or one or more other types of vehicles. In addition, in various examples, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a steering system 24, the braking system 26, a sensor system 28, an actuator system 30, at least one data storage device 32, at least one controller 34, a rear suspension system 35a, the front suspension system 35b, and an anti-lock braking system (ABS) 36. The propulsion system 20 may include a gasoline or diesel fueled combustion engine, an electric motor, a hybrid engine, or another type of engine or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission. The steering system 24 influences a position of the wheels 16-18. While depicted as including a steering wheel 24a for illustrative purposes, in some examples contemplated within the scope of the present disclosure, the steering system 24 may not include the steering wheel 24a.

The braking system 26 is configured to provide braking torque, pressure, or force to the wheels 16-18. The braking system 26 may, in various examples, include friction brakes, brake by wire, a regenerative braking system such as an electric machine, and/or other appropriate braking systems. In one example, the vehicle 10 includes the brake pedal 31, which is movable by the operator from a released position into a depressed position to activate the braking system 26 to apply the braking torque (i.e., pressure or force).

The front and rear suspension systems 35a and 35b are configured to support the weight of the vehicle 10, absorb shocks from the roadway, and provide a comfortable and stable ride for occupants. The front and rear suspension systems 35a and 35b may include various components such as, but not limited to, springs, dampers (shock absorbers), control arms (A-arms or wishbones), anti-roll bars, struts, bushings, linkages, and joints.

The ABS 36 is configured to reduce the likelihood of the wheels 16-18 from locking up during a braking event (i.e., application of the braking system 26), thereby maintaining tractive contact with the road and promote control over the vehicle 10. In some examples, the ABS 36 may include a central electronic control unit (ECU), four wheel speed sensors, and at least two hydraulic valves within brake hydraulics of the vehicle 10. The ECU monitors the rotational speed of each of the wheels 16-18. If the ECU detects that the wheels 16-18 are rotating significantly slower than the speed of the vehicle 10, a condition indicative of impending wheel lock, the ECU actuates the hydraulic valves to reduce hydraulic pressure to the braking system 26 at the affected wheels 16-18, thus reducing the braking force on the wheels 16-18 and allowing the wheels 16-18 to rotate faster. Conversely, if the ECU detects one of the wheels 16-18 turning significantly faster than the others, brake hydraulic pressure to the corresponding wheel 16-18 is increased so the braking force is reapplied, slowing down the corresponding wheel 16-18.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n can include, but are not limited to, deceleration sensors, wheel speed sensors, etc.

The actuator system 30 includes one or more actuator devices 42a-42n that control one or more vehicle features such as, but not limited to, the propulsion system 20, the transmission system 22, the steering system 24, and the braking system 26.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The storage device 32 can be any suitable type of storage apparatus, including various different types of direct access storage and/or other memory devices. In one example, the storage device 32 comprises a program product from which a computer readable memory device can receive a program that executes one or more processes of the present disclosure, such as the steps of the process discussed further below in connection with FIG. 3. In another example, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, examples of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the example depicted in FIG. 1. For example, the controller 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 34 may also otherwise differ from the example depicted in FIG. 1, for example in that the computer system of the controller 34 may be coupled to or may otherwise utilize one or more remote computer systems and/or other control systems.

Figure 2:
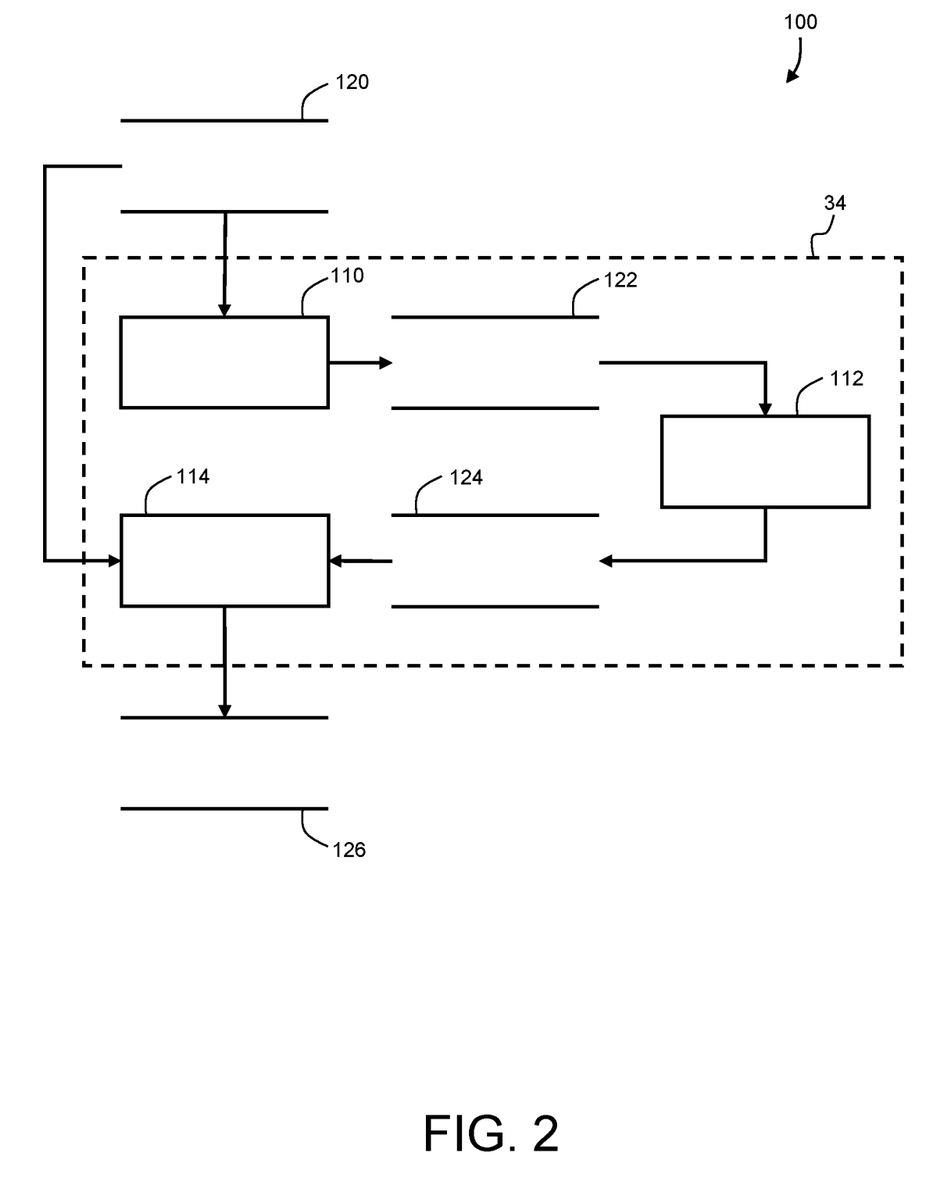
FIG. 2 is a dataflow diagram of the vehicle braking assistance system of FIG. 1 in accordance with various implementations.

With reference to FIG. 2 and with continued reference to FIG. 1, a dataflow diagram illustrates elements of the braking assistance system 100 of FIG. 1 in accordance with various examples. As can be appreciated, various examples of the system 100 according to the present disclosure may include any number of modules embedded within the controller 34 which may be combined and/or further partitioned to similarly implement systems and methods described herein. Furthermore, inputs to the system 100 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various examples, the system 100 includes an initiation module 110, a braking cycle monitoring module 112, and a smooth stop control module 114.

In various examples, the initiation module 110 receives as input sensor data 120 generated by one or more sensors (e.g., the sensing devices 40a-40n). The sensor data 120 includes various data indicating one or more observable conditions of the vehicle 10 such as, but not limited to, wheel slip and deceleration rate.

The initiation module 110 processes the sensor data 120 to detect a braking event of the vehicle 10 that initiates a braking cycle. The braking event may be an operator controller, initiated, and/or commanded braking event. For example, the braking event may be in response to an operator moving the brake pedal 31 from the released position into or toward the depressed position to activate the braking system 26 to apply the braking torque, pressure, or force. Various methods may be used to detect a braking event. In some examples, the braking event may be detected based on a deceleration rate of the vehicle 10. In some examples, the braking event may be detected based on an activation or command signal indicating application of the brakes of the braking system 26. The initiation module 110 generates initiation data 122 including data indicating a detection of the braking event.

In various examples, the braking cycle monitoring module 112 receives as input the initiation data 122 generated by the initiation module 110. The braking cycle monitoring module 112 performs monitoring of the vehicle state during the braking cycle in response to detection of the braking event. In some examples, the braking cycle monitoring module 112 monitors the deceleration rate of the vehicle 10 during a braking cycle. In such examples, the deceleration rate may be provided as one of the observable condition(s) or derived from one or more of the observable condition(s). The vehicle state, the deceleration rate, and/or other characteristics of the vehicle 10 indicated by or derived from the sensor data 120 may be analyzed and/or compared to stopping criteria. In some examples, the stopping criteria may be stored in the data storage device 32 or the computer readable storage device or media 46. In some examples, the comparison based on the stopping criteria may result in the braking cycle monitoring module 112 performing various actions. In some examples, the stopping criteria may provide conditions under which the braking cycle monitoring module 112 continues monitoring activities, ceases monitoring activities, or generates braking cycle monitoring data 124. For example, the braking cycle monitoring module 112 may cease monitoring activities when the deceleration rate exceeds a deceleration threshold indicative with activation of the ABS 35 during the braking cycle. As another example, the braking cycle monitoring module 112 may continue monitoring activities when the speed of the vehicle 10 is greater than a speed threshold indicative of an imminent complete stop (i.e., complete stop event) of the vehicle 10 while the deceleration rate is less than the aforementioned deceleration threshold. As yet another example, the braking cycle monitoring module 112 may initiate a reduction in the braking torque of the braking system 26 when the speed of the vehicle 10 is less than the speed threshold and the deceleration rate is less than the deceleration threshold. In some examples, the complete stop of the vehicle 10 may be considered to be imminent when the vehicle 10 is calculated, based, for example, on the speed and deceleration rate thereof, to completely stop within two seconds or less, such as one second or less. The braking cycle monitoring data 124 includes various data indicating that present conditions of the vehicle 10 are desirable for initiation of autonomous and/or automated braking assistance.

In various examples, the smooth stop control module 114 receives as input the sensor data 120. The smooth stop control module 114 also received as input the braking cycle monitoring data 124 generated by the braking cycle monitoring module 112. The smooth stop control module 114 determines a deceleration rate or deceleration profile suitable for reducing compression of the front suspension system 35b while stopping the vehicle 10 such that little to no rebound motion occurs upon complete stop of the vehicle 10. In some examples, the deceleration rate or deceleration profile may be based on a lookup table or graph stored in the data storage device 32 or the computer readable storage device or media 46. The smooth stop control module 114 generates smooth stop control data 126 that includes various data configured to command the braking system 26 of the vehicle 10 to adjust the braking torque applied thereby to cause deceleration of the vehicle 10 at the desirable decelerate rate or deceleration profile (e.g., having a variable or changing deceleration rate). The smooth stop control module 114 may transmit the smooth stop control data 126 to the braking system 26.

Figure 3:
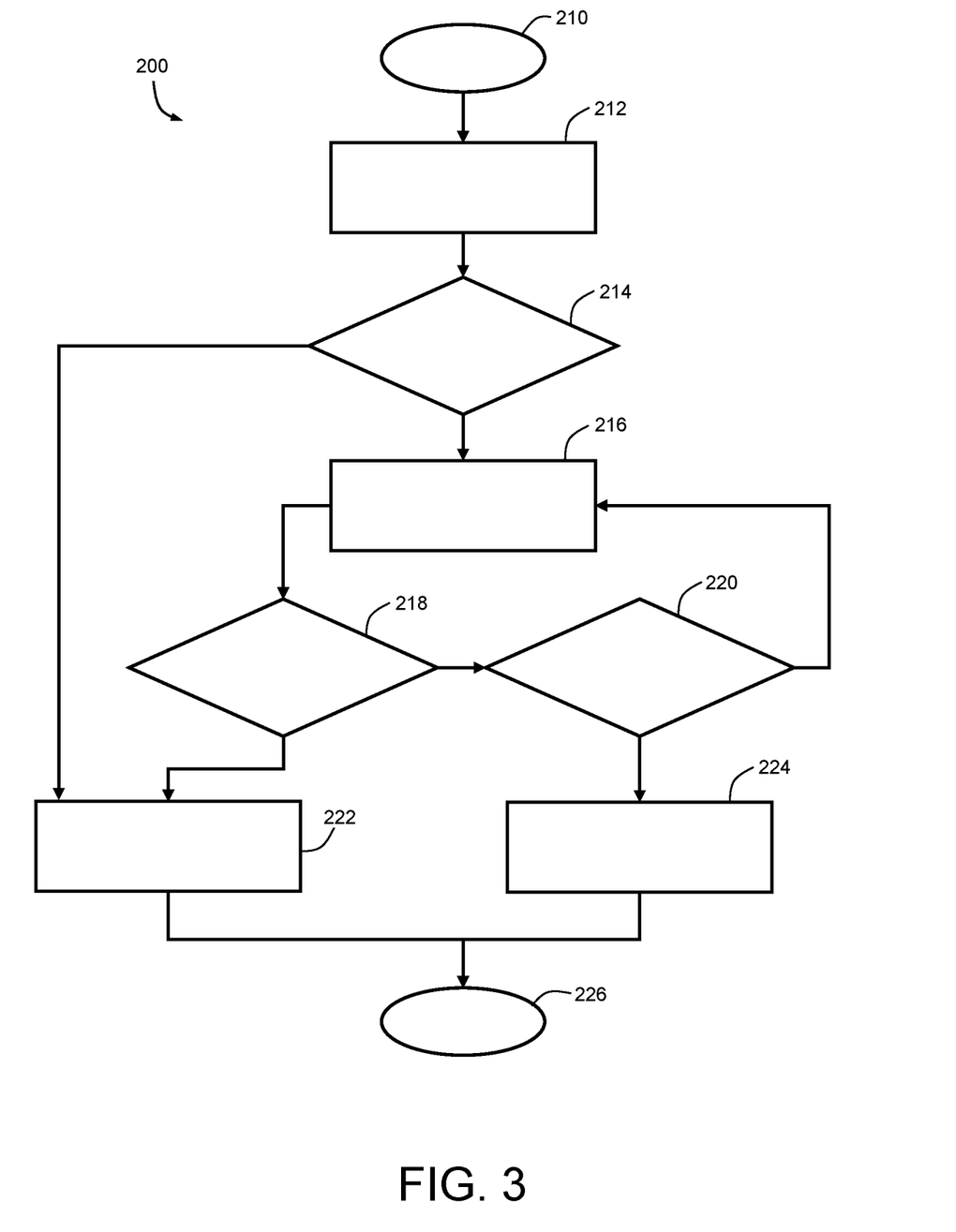
FIG. 3 is a flow diagram of a method for vehicle braking assistance in accordance with various implementations.

With reference now to FIG. 3 and with continued reference to FIGS. 1-2, a flowchart provides a method 200 for braking assistance for the vehicle 10, for example, as performed by the system 100, in accordance with various examples. As can be appreciated in light of the disclosure, the order of operation within the method 200 is not limited to the sequential execution as illustrated in FIG. 3, but may be performed in one or more varying orders as applicable and in accordance with the present disclosure. In various examples, the method 200 can be scheduled to run based on one or more predetermined events, and/or can run continuously during operation of the vehicle 10.

In one example, the method 200 may start at 210. In some examples, the method 200 may start in response to detection of a braking event of the vehicle 10.

At 212, the method 200 may include monitoring for wheel slip. In some examples, a wheel speed sensor of the vehicle 10 may be configured to detect wheel slip. If wheel slip is detected at 214, the ABS 36 is expected to engage at 222 and the method 200 may end at 226.

At 216, the method 200 may include monitoring deceleration rate and speed of the vehicle 10. At 218, the deceleration rate is compared to a deceleration threshold. If the deceleration rate exceeds the deceleration threshold at 218, then the ABS 36 is expected to engage at 222 and the method 200 may end at 226. If the deceleration rate is less than the deceleration threshold at 218, the method 200 may continue to 220. In some examples, the deceleration threshold represents a deceleration rate corresponding to wheel slip. For example, the deceleration threshold may be based on a deceleration rate associated with a specific likelihood of causing wheel slip.

At 220, the method 200 may include comparing the speed to a speed threshold. If the speed is greater than the speed threshold, the method 200 may including continuing to monitor the deceleration rate and speed at 216. If the speed is less than the speed threshold at 220, then the method 200 may include reducing the braking torque applied by the braking system 26 to provide reduce compression within the front suspension system 35b and thereby reduce a rebound motion that may occur during a complete stop of the vehicle 10. The method 200 may end at 226. In some examples, the method 200 ends in response to a complete stop event of the vehicle 10.

The systems and methods disclosed herein provide various benefits over certain existing systems and methods. For example, operator initiated, controlled, or commanded braking during a braking event often results in a rebound motion upon complete stop of the vehicle 10 resulting from a rapid reduction of compression within the suspension system 35 due to forward momentum of the vehicle 10. The systems and methods disclosed herein provide for intervention of the operator initiated, controlled, or commanded braking and provide an automatic or autonomous reduction of the braking torque, pressure, or force applied by the braking system 26 of the vehicle 10 during and/or concurrent to the operator initiated, controlled, or commanded braking. This reduction in the braking torque may allow the front suspension system 35b to more gradually decompress and thereby reduce the rebound motion upon complete stop of the vehicle 10. In some examples, the rebound motion may be sufficiently reduced such that the rebound motion is not perceivable by the operator of the vehicle 10. This may promote ride quality and improved vehicle component life spans.

While at least one embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for providing braking assistance for a vehicle, the method comprising:

receiving, from one or more sensors of the vehicle, sensor data indicative of an observable condition of the vehicle;

detecting, with one or more processors, a braking event of the vehicle that initiates a braking cycle;

monitoring, with the one or more processors, a vehicle state of the vehicle including a deceleration rate of the vehicle during the braking cycle in response to detecting the braking event, wherein the vehicle state and the deceleration rate is based on the observable condition;

processing, with the one or more processors, the sensor data to determine whether the vehicle state will trigger activation of an antilock braking system (ABS) of the vehicle during the braking cycle in response to detection of wheel slip or in response to the deceleration rate exceeding a deceleration threshold;

estimating, with the one or more processors, a complete stop event wherein the vehicle is expected to stop based, at least in part, on the deceleration rate; and outputting, with the one or more processors, one or more control signals to command a braking system of the vehicle to reduce a braking torque applied to wheels of the vehicle by the braking system at a rate sufficient to reduce compression of a front suspension system of the vehicle prior to the complete stop event of the vehicle in response to the deceleration rate satisfying a stopping criteria and a determination that the vehicle state will not trigger activation of the ABS, wherein the one or more control signals command the braking system to reduce the braking torque at a rate sufficient to reduce a rebound motion of the vehicle that occurs at the complete stop of the vehicle, wherein the one or more control signals to command the braking system are generated to reduce the braking torque over a time period of two seconds or less prior to the complete stop event.

2. The method of claim 1, further comprising:
estimating a complete stop event when the vehicle is expected to stop based, at least in part, on the deceleration rate; and
generating the one or more control signals to command the braking system to reduce the braking torque over a time period of two seconds or less prior to the complete stop event.

3. The method of claim 1, wherein detecting the braking event is based on the observable condition.

4. The method of claim 1, wherein the sensor data includes data indicative of wheel slip of the wheels of the vehicle, and a determination is made that the vehicle state will trigger activation of the ABS in response to detection of the wheel slip.

5. The method of claim 1, wherein a determination is made that the vehicle state will trigger activation of the ABS in response to the deceleration rate exceeding a deceleration threshold.

6. The method of claim 5, wherein the deceleration threshold represents a predetermined deceleration rate corresponding to wheel slip.

7. The method of claim 1, wherein the stopping criteria includes data correlating the deceleration rate and time.

8. The method of claim 1, wherein the sensor data include:
wheel data indicative of wheel slip of the wheels of the vehicle generated by a wheel speed sensor of the vehicle; and
acceleration data indicative of the deceleration rate of the vehicle generated by a deceleration sensor of the vehicle.

9. A system for vehicle braking assistance for a vehicle, comprising:
a sensor system comprising one or more sensors configured to sense an observable condition of the vehicle;
a controller in operable communication with the sensor system and a braking system of the vehicle, the controller configured to, by one or more processors:
receive, from the sensor system, sensor data indicative of the observable condition of the vehicle;
detect a braking event of the vehicle that initiates a braking cycle based on the observable condition;
monitor a vehicle state of the vehicle including a deceleration rate of the vehicle during the braking cycle in response to detecting the braking event, wherein the vehicle state and the deceleration rate is based on the observable condition;
process the sensor data to determine whether the vehicle state will trigger activation of an antilock braking system (ABS) of the vehicle during the braking cycle in response to detection of wheel slip or in response to the deceleration rate exceeding a deceleration threshold;
estimate a complete stop event wherein the vehicle is expected to stop based, at least in part, on the deceleration rate; and
output one or more control signals to command a braking system of the vehicle to reduce a braking torque applied to wheels of the vehicle by the braking system at a rate sufficient to reduce compression of a front suspension system of the vehicle prior to the complete stop event of the vehicle in response to the deceleration rate satisfying a stopping criteria and a determination that the vehicle state will not trigger activation of the ABS, wherein the one or more control signals command the braking system to reduce the braking torque at a rate sufficient to reduce a rebound motion of the vehicle that occurs at the complete stop of the vehicle, wherein the one or more control signals to command the braking system are generated to reduce the braking torque over a time period of two seconds or less prior to the complete stop event.

10. The system of claim 9, wherein the controller is configured to, with the one or more processors:
estimate a complete stop event when the vehicle is expected to stop based, at least in part, on the deceleration rate; and
generate the one or more control signals to command the braking system to reduce the braking torque over a time period of two seconds or less prior to the complete stop event.

11. The system of claim 9, wherein the sensor data includes data indicative of wheel slip of wheels of the vehicle, and the controller is configured to, with the one or more processors, determine that the vehicle state will trigger activation of the ABS in response to detection of the wheel slip.

12. The system of claim 9, wherein the controller is configured to, with the one or more processors, determine that the vehicle state will trigger activation of the ABS in response to the deceleration rate exceeding a deceleration threshold.

13. The system of claim 9, wherein the stopping criteria includes data correlating the deceleration rate and time.

14. The system of claim 9, wherein the sensor data include:
wheel data indicative of wheel slip of wheels of the vehicle generated by a wheel speed sensor; and
the deceleration rate of the vehicle generated by a deceleration sensor.

15. A vehicle, comprising:
a braking system configured to apply a braking torque to wheels of the vehicle;
a sensor system comprising one or more sensors configured to sense an observable condition of the vehicle;
an anti-lock braking system (ABS);
a front suspension system; and
a controller in operable communication with the braking system and the sensor system, the controller configured to, by one or more processors:
receive, from the sensor system, sensor data indicative of the observable condition of the vehicle;
detect a braking event of the vehicle that initiates a braking cycle;
monitor a vehicle state of the vehicle including a deceleration rate of the vehicle during the braking cycle in response to detecting the braking event, wherein the vehicle state and the deceleration rate is based on the observable condition;
process the sensor data to determine whether the vehicle state will trigger activation of the ABS of the vehicle during the braking cycle in response to detection of wheel slip or in response to the deceleration rate exceeding a deceleration threshold;

estimate a complete stop event wherein the vehicle is expected to stop based, at least in part, on the deceleration rate; and output one or more control signals to command the braking system of the vehicle to reduce the braking torque applied to the wheels of the vehicle by the braking system at a rate sufficient to reduce compression of the front suspension system of the vehicle prior to the complete stop event of the vehicle in response to the deceleration rate satisfying a stopping criteria and a determination that the vehicle state will not trigger activation of the ABS, wherein the one or more control signals command the braking system to reduce the braking torque at a rate sufficient to reduce a rebound motion of the vehicle that occurs at the complete stop of the vehicle, wherein the one or more control signals to command the braking system are generated to reduce the braking torque over a time period of two seconds or less prior to the complete stop event.

16. The vehicle of claim 15, wherein the one or more sensors of the sensor system include:

a wheel speed sensor configured to sense a speed of rotation of the wheels of the vehicle, and generate wheel data indicative of wheel slip of the wheels; and a deceleration sensor configured to sense the deceleration rate of the vehicle, and generate deceleration data indicative of the deceleration rate, wherein the sensor data includes the wheel data and the deceleration data.

17. The vehicle of claim 15, wherein the controller is configured to, with the one or more processors, process the sensor data to determine whether the vehicle state will trigger activation of the ABS of the vehicle during the braking cycle in response to the deceleration rate exceeding a deceleration threshold that represents a predetermined deceleration rate corresponding to wheel slip.

* * * * *